(12) United States Patent
Dubois et al.

(10) Patent No.: US 10,370,556 B2
(45) Date of Patent: Aug. 6, 2019

(54) SURFACE MODIFICATION BY POLYMER ANCHORING ON POROUS SUBSTRATES

(71) Applicant: International Business Machines Corporation, Armonk, NY (US)

(72) Inventors: Geraud J. M. Dubois, Los Altos, CA (US); Krystelle Lionti, Campbell, CA (US); Teddie P. Magbitang, San Jose, CA (US); Willi Volksen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/375,418

(22) Filed: Dec. 12, 2016

(65) Prior Publication Data
US 2018/0163076 A1    Jun. 14, 2018

(51) Int. Cl.
| | | |
|---|---|---|
| *C09D 133/12* | (2006.01) | |
| *C09D 125/06* | (2006.01) | |
| *B05D 3/10* | (2006.01) | |
| *B05D 5/00* | (2006.01) | |
| *B05D 1/00* | (2006.01) | |
| *B05D 3/02* | (2006.01) | |

(52) U.S. Cl.
CPC .......... *C09D 133/12* (2013.01); *B05D 1/005* (2013.01); *B05D 3/02* (2013.01); *B05D 3/107* (2013.01); *B05D 5/00* (2013.01); *C09D 125/06* (2013.01); *B05D 2203/30* (2013.01)

(58) Field of Classification Search
CPC ......... B05D 5/00; B05D 3/0254; B05D 3/107
See application file for complete search history.

(56) References Cited

U.S. PATENT DOCUMENTS

| | | | |
|---|---|---|---|
| 5,049,275 A | 9/1991 | Gillberg-LaForce et al. | |
| 5,627,217 A | 5/1997 | Rilling et al. | |
| 6,994,972 B2 | 2/2006 | Bardhan et al. | |
| 2013/0017682 A1* | 1/2013 | Bruce | H01L 21/3105 438/694 |
| 2013/0017688 A1* | 1/2013 | Dubois | H01L 21/3105 438/759 |
| 2013/0225701 A1 | 8/2013 | Soice et al. | |
| 2016/0101192 A1 | 4/2016 | Berthelot et al. | |

OTHER PUBLICATIONS

Ed Petrie, Fundamentals of Paint Adhesion, May 22, 2012.*
Tan et al., Multilayer sol-gel coatings for corrosion protection of magnesium, Surf. Coat. Tech. 198:478-482 (2005).
(Continued)

*Primary Examiner* — Alex A Rolland
(74) *Attorney, Agent, or Firm* — Karen Canaan; CanaanLaw, P.C.

(57) ABSTRACT

Disclosed is a method for mechanically anchoring polymers on the surface of a porous substrate by trapping polymer chains within the pores of the substrate under capillary forces. Surface modification of the porous substrate is achieved by anchoring one end of the polymer chains within the pores while one or more other ends of the polymer chains dangle from the surface of the porous substrate. The method provides a unique way of modifying the surface of a material without chemical reactions or precursor-substrate interactions.

22 Claims, 11 Drawing Sheets

(56) References Cited

OTHER PUBLICATIONS

Chai et al., Anodizing of magnesium alloy AZ31 in alkaline solutions with silicate under continuous sparking, Corros. Sci. 50:3274-3279 (2008).
Lionti et al., Hybrid silica coatings on polycarbonate: enhanced properties, J. Sol-Gel Sci. Technol. 65:52-60 (2013).
Lionti et al., Independent Control of Adhesive and Bulk Properties of Hybrid Silica Coatings on Polycarbonate, ACS Appl. Mater. Interfaces 5(21):11276-11280 (2013).
Hutmacher, Scaffolds in tissue engineering bone and cartilage, Biomaterials 21:2529-2543 (2000).
Kuo et al., Magnetically triggered nanovehicles for controlled drug release as a colorectal cancer therapy, Colloid Surface B 140:567-573 (2016).
Chen et al., Transparent superhydrophobic/superhydrophilic coatings for self-cleaning and anti-fogging, Appl. Phys. Lett. 101:033701.1-033701.4 (2012).
Mostefao et al., Fluoroalkylsilanes as non-stick coatings: adhesion of glucose and its thermal byproducts, Int. J. Adhes. Adhes. 18:273-281 (1998).
Korzhikov et al., Water-Soluble Aldehyde-Bearing Polymers of 2-Deoxy-2-methacrylamido-D-glucose for Bone Tissue Engineering, Journal of Applied Polymer Science 108:2386-2397 (2008).
Vlakh et al., Development of multifunctional polymer-mineral composite materials for bone tissue engineering, Journal of Biomedical Research A 75(2):333-341 (2005).

\* cited by examiner

SURFACE MODIFICATION BY POLYMER ANCHORING ON POROUS SUBSTRATES

TECHNICAL FIELD

The invention relates generally to substrate surface modification and more specifically to surface modification by mechanical anchoring of polymer chains on porous substrate surfaces.

BACKGROUND OF THE INVENTION

Surface modification is a technique that makes a material more resistant to its surrounding environment by changing the physical, chemical, or biological properties of the material. Surface modification is used in many industries. For example, in the automotive industry, surface modification may be used to increase the lifetime of an anti-corrosion treatment that is applied on the body of an automotive vehicle. In the biomedical industry, surface modification may be used to make a material more suitable for the subsequent steps of an integration process, such as for example, adhesion promoting treatments, tissue engineering, and drug delivery. Surface modification may also be used to bring a new useful functionality to an existing material to make it more suitable for use in different industries. For example, surface modification may be used to add anti-fog or non-stick properties to an existing material. Additional industries that routinely use surface modification are the power, electronics, textile, and construction industries.

Effective surface modification techniques require chemical compatibility between the material and chemical precursors that function as the modifying agent. Thus, chemical precursors that are routinely used for chemical interactions, such as covalent bonds, π bond, and electrostatic interactions, may be ineffective for surface modification if the chemical precursor and the material are chemically incompatible.

SUMMARY OF THE INVENTION

A preferred aspect of the present invention provides a method for surface modification that requires only mechanical modification without chemical modification.

In one embodiment, the method comprises: (a) depositing a polymeric material comprising individual polymer chains over a surface of a porous substrate, wherein each individual polymer chain has a first end and at least one opposite end; (b) treating the polymeric material such that (i) the first end of each of the individual polymer chains mechanically anchors to a pore of the porous substrate and (ii) the at least one opposite end of each of the individual polymer chains extend from the surface of the porous substrate, wherein the mechanical anchoring is free of chemical bonds; and (c) removing excess polymeric material from the surface of the porous substrate, thereby removing polymer chains that are not mechanically anchored to a pore of the porous substrate.

In another embodiment, the method, comprises: (a) depositing a polymeric material comprising polymer chains over a porous substrate; (b) promoting flow of the polymeric material into pores on a top portion of the porous substrate, wherein the polymeric material is not chemically bonded to pore walls of the porous substrate (i.e., the polymeric material is mechanically anchored and/or trapped in the pores); and (c) removing, from the top portion of the porous substrate, a portion of the polymeric material, wherein the polymer chains are mechanically anchored to the pores of the porous substrate and extend from the top portion of the porous substrate.

In a further embodiment, the polymeric material of step (b) may be treated by baking the porous substrate at a temperature above the glass transition temperature of the polymer.

In still a further embodiment, the polymeric material of step (c) may be removed from the porous substrate with a solvent, which may be selected from the group consisting of propylene glycol methyl ether acetate, propylene glycol monomethyl ether, toluene, and combinations thereof.

In another embodiment, at least one opposite end of the individual polymer chain comprises more than one opposite end extending from the surface of the porous substrate.

In a further embodiment, each individual polymer chain has an end-to-end radius ($R_{ee}$) that is approximately five to ten times larger than individual pore diameters ($\varnothing_D$) of the pores of the porous substrate. In other words, the ratio of $R_{ee}/\varnothing_D$ is in the range of 5 to 10.

In still a further embodiment, the ratio of the polymer's average end-to-end distance to the average pore diameter is in the range of 5 to 10.

In another embodiment, the pores of the porous substrate have an average pore diameter in the range of about 1 nm to about 1 μm.

In a further embodiment, the pores of the porous substrate have an average pore diameter in the range of about 1 nm to about 200 nm.

In another embodiment, the polymeric material comprises linear polymers, branched polymers, or a combination of linear and branched polymers.

In a further embodiment, the linear or branched polymers are selected from the group consisting of polymethacrylates, polyimides, polybenzoxazoles, polybenzimidazoles, poly(aniline), poly(phenylene sulfide), phenol-formaldehyde/cresol-formaldehyde resins, polystyrenes, polylactic acid, polyesters, poly(bisbenzocyclobutene), poly(divinylsiloxanebis-benzocyclobutene), poly(aromatics), polyamides, polyamide-imides, polyetherimides, polyphenylquinoxalines, poly(perfluoroethers), soluble, fluorinated polyalkanes, poly(acrylonitrile), polyetherketones, poly(vinylalcohol), poly(styrene-co-styrene sulfonic acid), poly(acrylic acid), poly(hydroxyethylmethacrylate), poly(vinyl imidizolium sulfobetaine), poly(vinyl pyridinium sulfobetaine), poly(amido amines), poly(styrene-butadiene-styrene) block copolymers, poly(butadiene), poly(isoprene), polysilazanes, polyureasilazane, poly(perhydrosilazane), polysilazanes, poly(metal oxides), silicates, titanates, aluminosilicates, aluminates, zirconates, and combinations thereof.

In another embodiment, the polymeric material comprises poly(methyl methacrylate) (PMMA), polystyrene, or a combination of PMMA and polystyrene.

In a further embodiment, the porous substrate is a silica film.

In another embodiment, the porous substrate is a material selected from the group consisting of zeolites, zeolite-like materials, pillared materials, clathrasils, clathrates, carbon molecular sieves, ordered mesoporous materials, organic/inorganic porous hybrid materials, porous metal oxides, and combinations thereof.

In a further embodiment, the organic/inorganic porous hybrid material is a porous hybrid silica film.

Additional aspects and embodiments of the invention will be provided, without limitation, in the detailed description of the invention that is set forth below.

DETAILED DESCRIPTION OF THE INVENTION

Set forth below is a description of what are currently believed to be preferred embodiments of the claimed invention. Any alternates or modifications in function, purpose, or structure are intended to be covered by the claims of this application. As used in this specification and the appended claims, the singular forms "a," "an," and "the" include plural referents unless the context clearly dictates otherwise. The terms "comprises" and/or "comprising," as used in this specification and the appended claims, specify the presence of stated features, integers, steps, operations, elements, and/or components, but do not preclude the presence or addition of one or more other features, integers, steps, operations, elements, components, and/or groups thereof.

The terms "method" and "process" are used interchangeably herein to describe the surface modification procedure described herein.

Provided is a method for modifying the surface of a porous substrate without chemical reactions or precursor-substrate interactions. The method comprises strict mechanical anchoring of one end of a polymer chain within a pore of a porous substrate while one or more opposite ends of the polymer chain dangles from the surface of the substrate.

Figure 1:
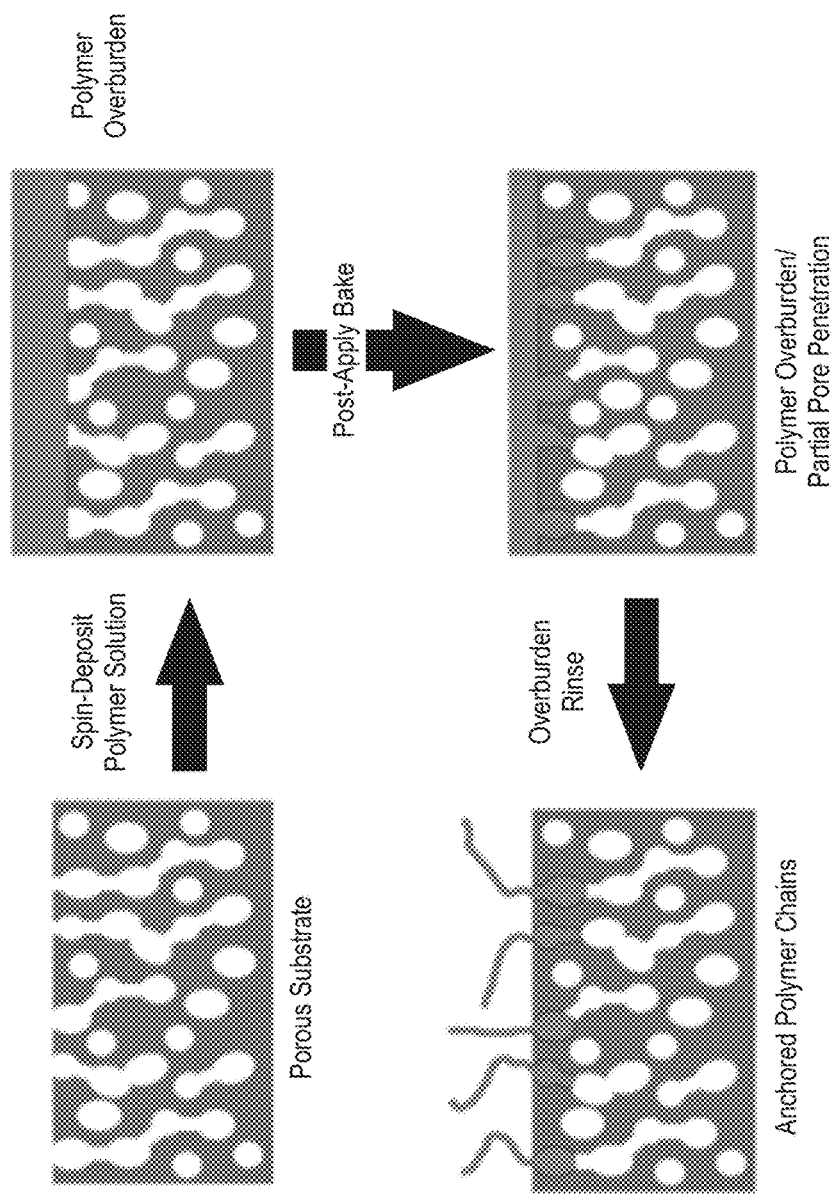
FIG. 1 is a schematic diagram of the three-step-process used to mechanically anchor polymer chains on the surface of a porous substrate.

In one embodiment, the method comprises the following three steps, which are shown schematically in FIG. 1: (1) dissolving a polymer in a solvent to form a polymer solution, wherein the polymer solution is spin-deposited on a surface of the porous substrate; (2) baking the processed porous substrate at a temperature above the glass transition temperature of the polymer, wherein as a result of the baking, the viscosity of the polymer drops and strong capillary forces present in the processed porous substrate trigger reptation of polymer chains in pores of the substrate; and (3) rinsing the surface of the porous substrate with a solvent to remove excess polymer chains on the surface that are not mechanically anchored to the surface of the porous substrate.

In another embodiment, the diameter of individual pores of the porous substrate is in the range of about 1 nm to about 1 μm. In a further embodiment, the diameter of the pores of the porous substrate is in the range of about 1 nm to about 200 nm.

Figure 2:
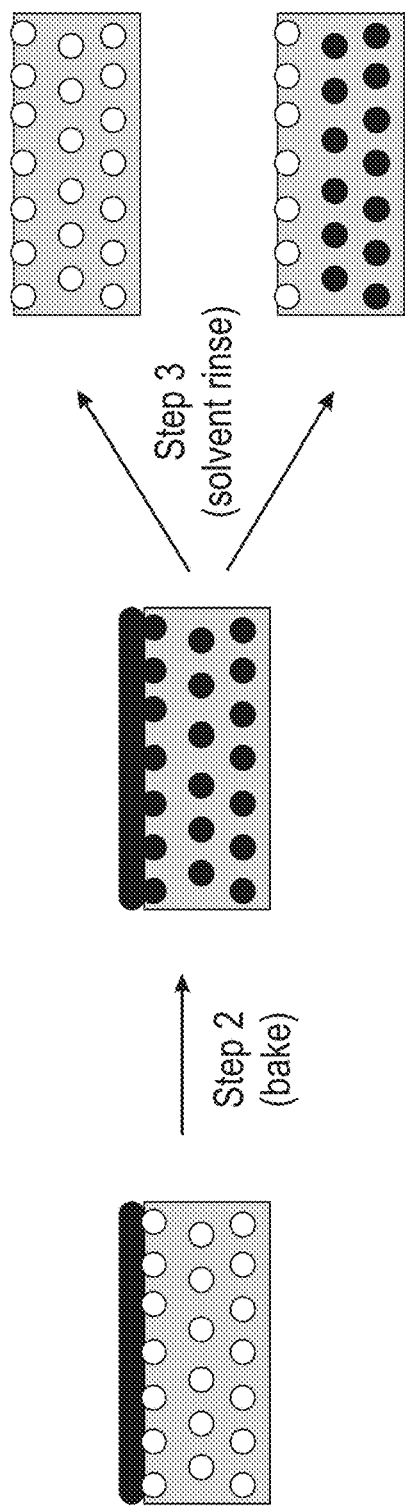
FIG. 2 is a schematic diagram showing that polymer chains with end-to-end radii that are smaller than the substrate pore diameters are able to penetrate the substrate pores at the baking step (step 2), but that the polymer chains separate from the pores at the rinsing step (step 3).
Figure 3:
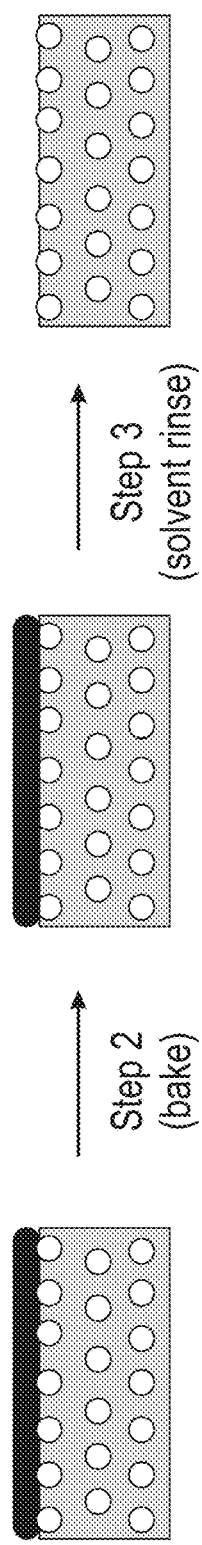
FIG. 3 is a schematic diagram showing that polymer chains with end-to-end radii that are substantially larger than the substrate pore diameters result in no anchoring of the polymer chains to the substrate pores.

Mechanical anchoring of the polymer chains onto the surface of the porous substrate is dependent upon the size of the polymer chains in relation to the size of the substrate pores. For example, as shown in FIG. 2, if the individual polymer chains have end-to-end radii that are smaller than the diameters of the individual pores of the porous substrate, the polymer chains can readily penetrate the pores; however, the polymer chains can also be readily removed from the pores during the rinsing step (step 3). The result of this scenario is that surface modification of the porous substrate does not occur. Conversely, as shown in FIG. 3, if the end-to-end radii of the polymer chains are much larger than the diameters of the pores, then even despite strong capillary forces during step 2, the polymer chains will not be able to penetrate the pores resulting in no surface modification of the porous substrate. Optimal penetration of the polymer chains occurs when (i) the polymer chains have end-to-end radii that are slightly larger than the pore diameters, (ii) the capillary forces of step 2 are sufficient to drag the polymer chains inside the pores; and (iii) the chains penetrate the pores in a confined state, which locks the polymer chains within the pores and prevents them from being rinsed from the porous substrate during the rinsing step. It should be noted that if the polymer chains are slightly larger than the pores, but the capillary forces of step 2 are insufficient, then the polymer chains will still be rinsed from the porous substrate surface during the rinsing step (see FIG. 3).

Examples of porous substrates that may be used for the surface modification described herein include without limitation zeolites and zeolite-like materials, pillared materials, clathrasils and clathrates, carbon molecular sieves, ordered mesoporous materials, organic/inorganic porous hybrid materials, and porous metal oxides. A non-limiting example of an organic/inorganic porous hybrid material that may be used with the present invention is a porous hybrid silica film.

Examples of polymeric materials that may be used to modify the surface of substrates include without limitation linear or branched polymers selected from the group consisting of polymethacrylates, polyimides, polybenzoxazoles, polybenzimidazoles, poly(aniline), poly(phenylene sulfide), phenol-formaldehyde/cresol-formaldehyde resins, polystyrenes, polylactic acid, polyesters, poly(bisbenzocyclobutene), poly(divinylsiloxanebis-benzocyclobutene), poly(aromatics), polyamides, polyamide-imides, polyetherimides, polyphenylquinoxalines, poly(perfluoroethers), soluble, fluorinated polyalkanes, poly(acrylonitrile), polyetherketones, poly(vinylalcohol), poly(styrene-co-styrene sulfonic acid), poly(acrylic acid), poly(hydroxyethylmethacrylate), poly(vinyl imidizolium sulfobetaine), poly(vinyl pyridinium sulfobetaine), poly(amido amines), poly(styrene-butadiene-styrene) block copolymers, poly(butadiene), poly(isoprene), polysilazanes, polyureasilazane, poly(perhydrosilazane), polysilazanes, poly(metal oxides), silicates, titanates, aluminosilicates, aluminates, zirconates, and combinations thereof. An example of a poly(aromatic) is the SiLK® polymer (Dow Chemical Company, Midland, Mich., USA), which is a crosslinked poly(aromatic) matrix. Examples of poly(metal oxides) include metals from Groups 4, 13, and 14 of the IUPAC Periodic Table of the Elements.

Any solvents that can dissolve the polymer may be used to rinse the surface of the modified porous substrates. Examples of such solvents include, without limitation, propylene glycol methyl ether acetate, propylene glycol monomethyl ether, toluene, and combinations thereof.

Figure 4A:
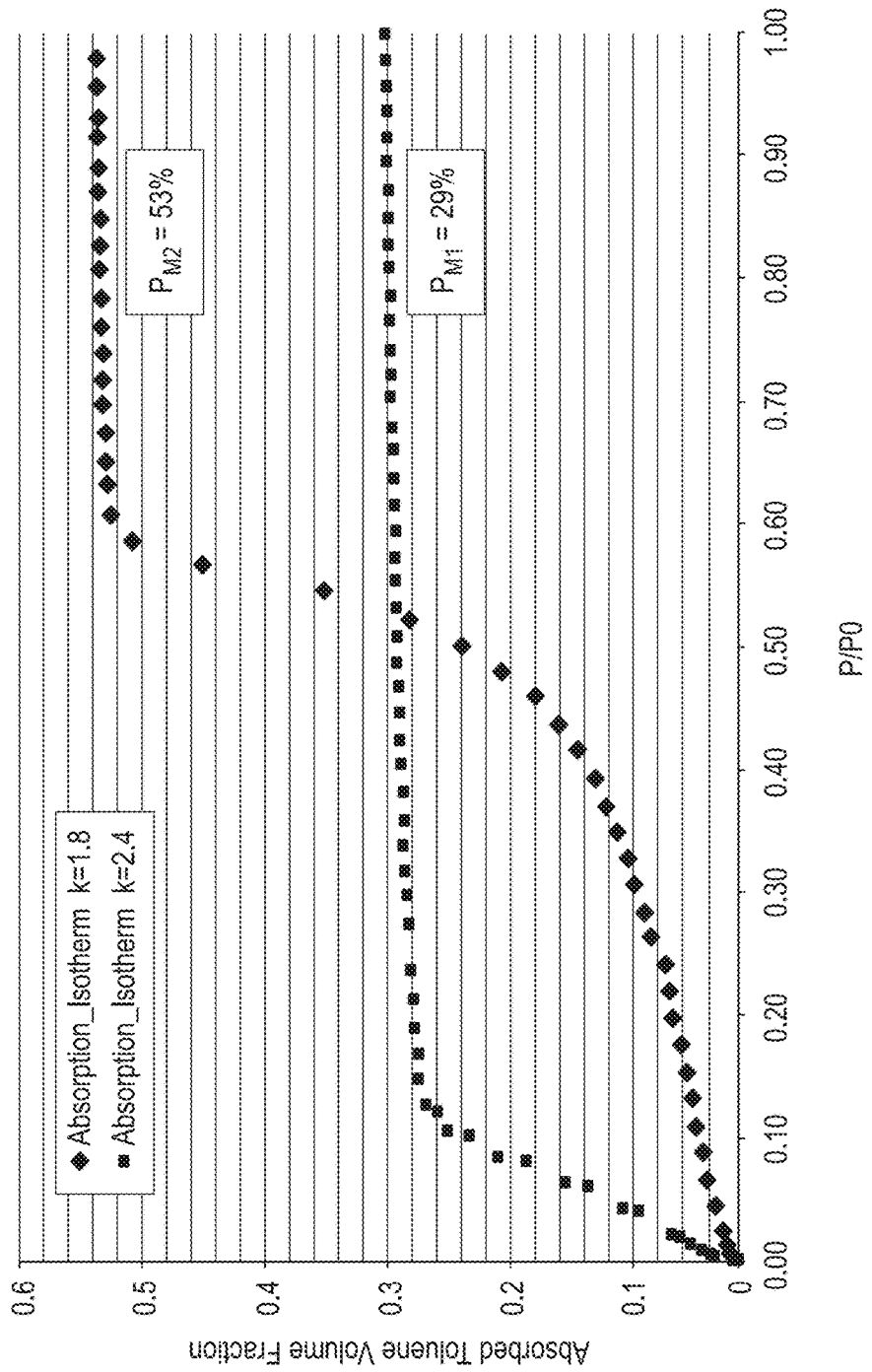
FIGS. 4A and 4B show ellipsometric porosimetry data in graphical format for the two porous films, M1 and M2.
Figure 4B:
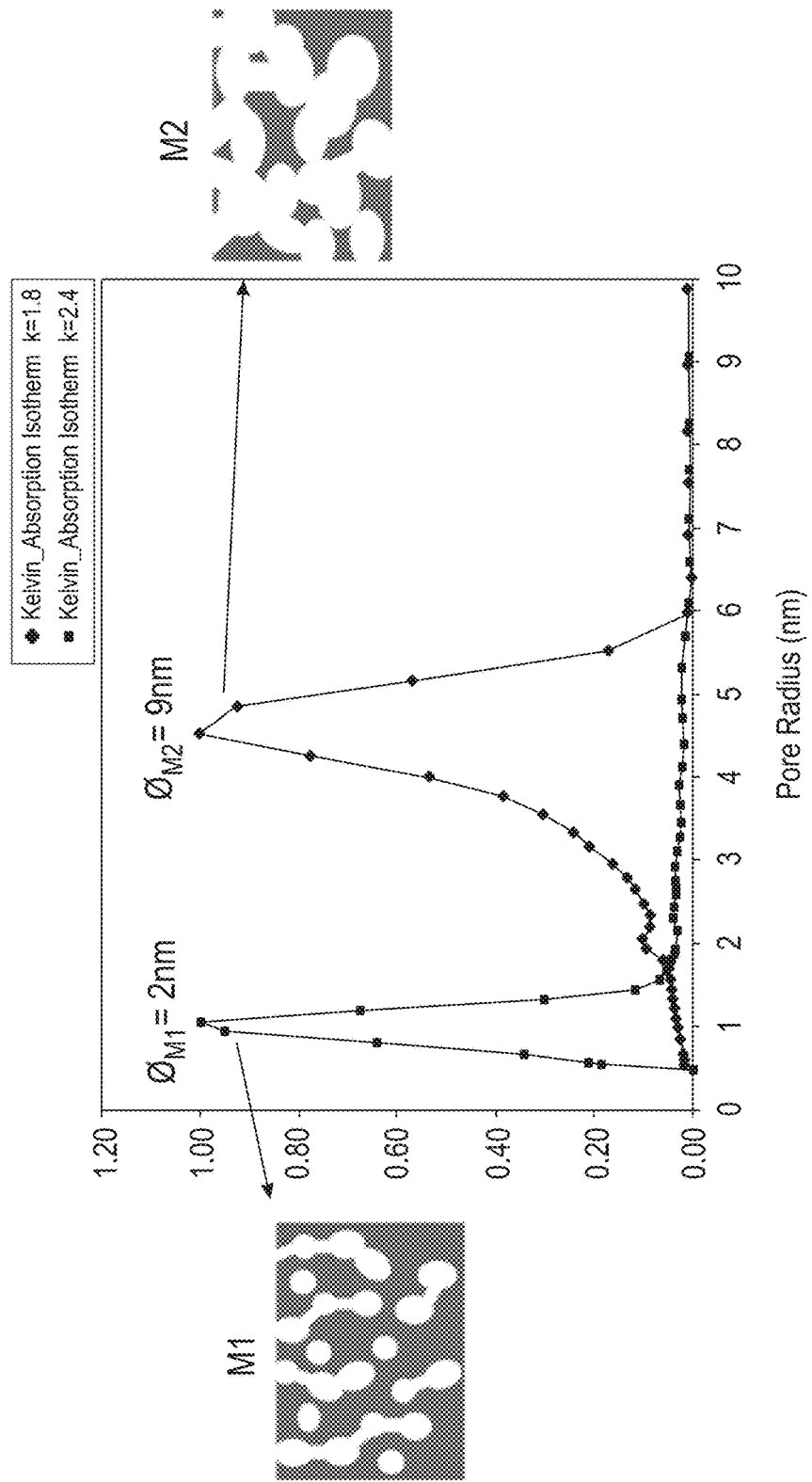
Figure 5A:
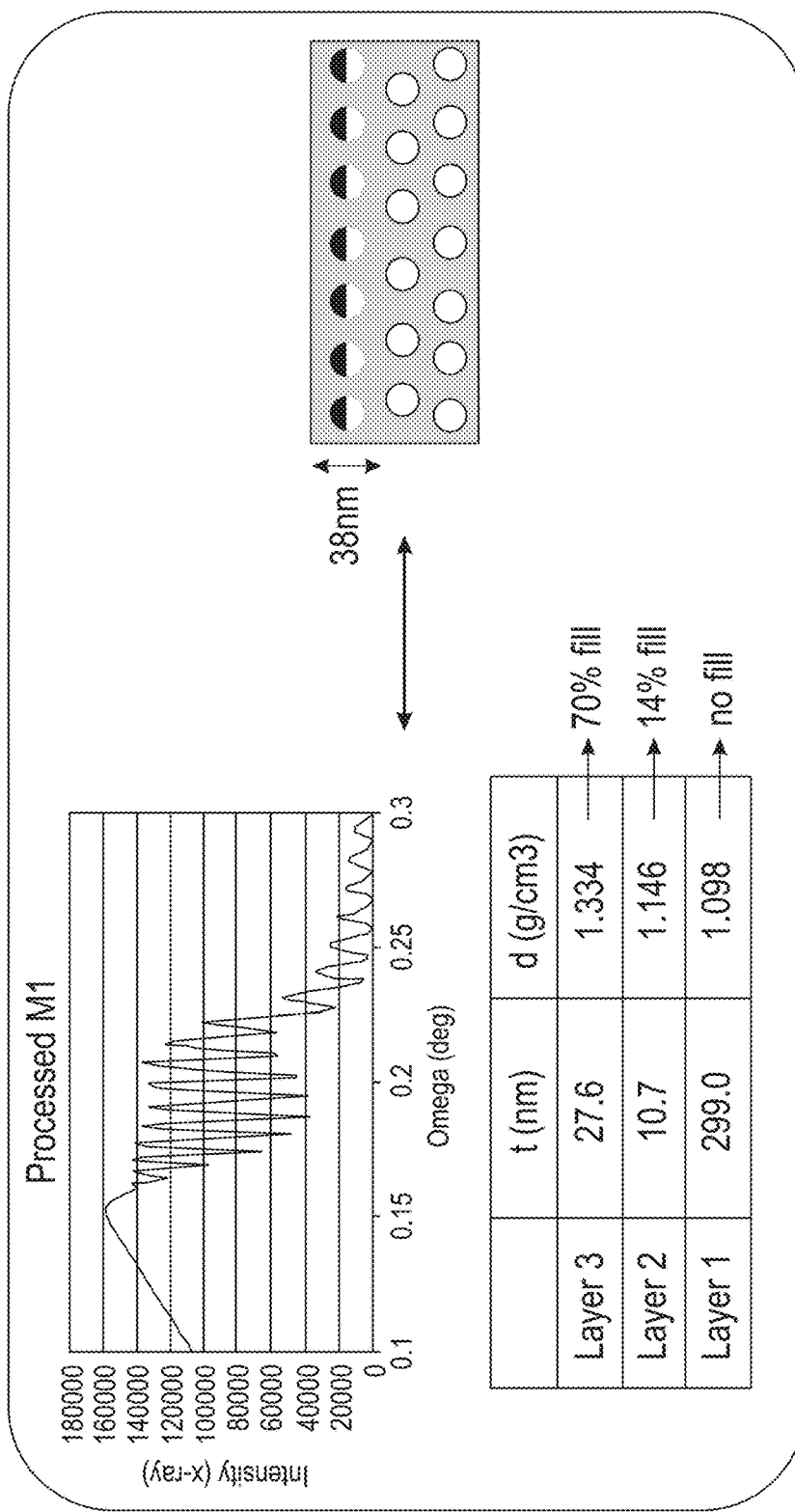
FIG. 5A includes a graph showing X-ray reflectivity (XRR) data for the M1 porous film as well as a diagram illustrating the anchoring of the polymeric material onto the M1 film and a corresponding data table providing numerical values for the polymer anchoring on the M1 film.
Figure 5B:
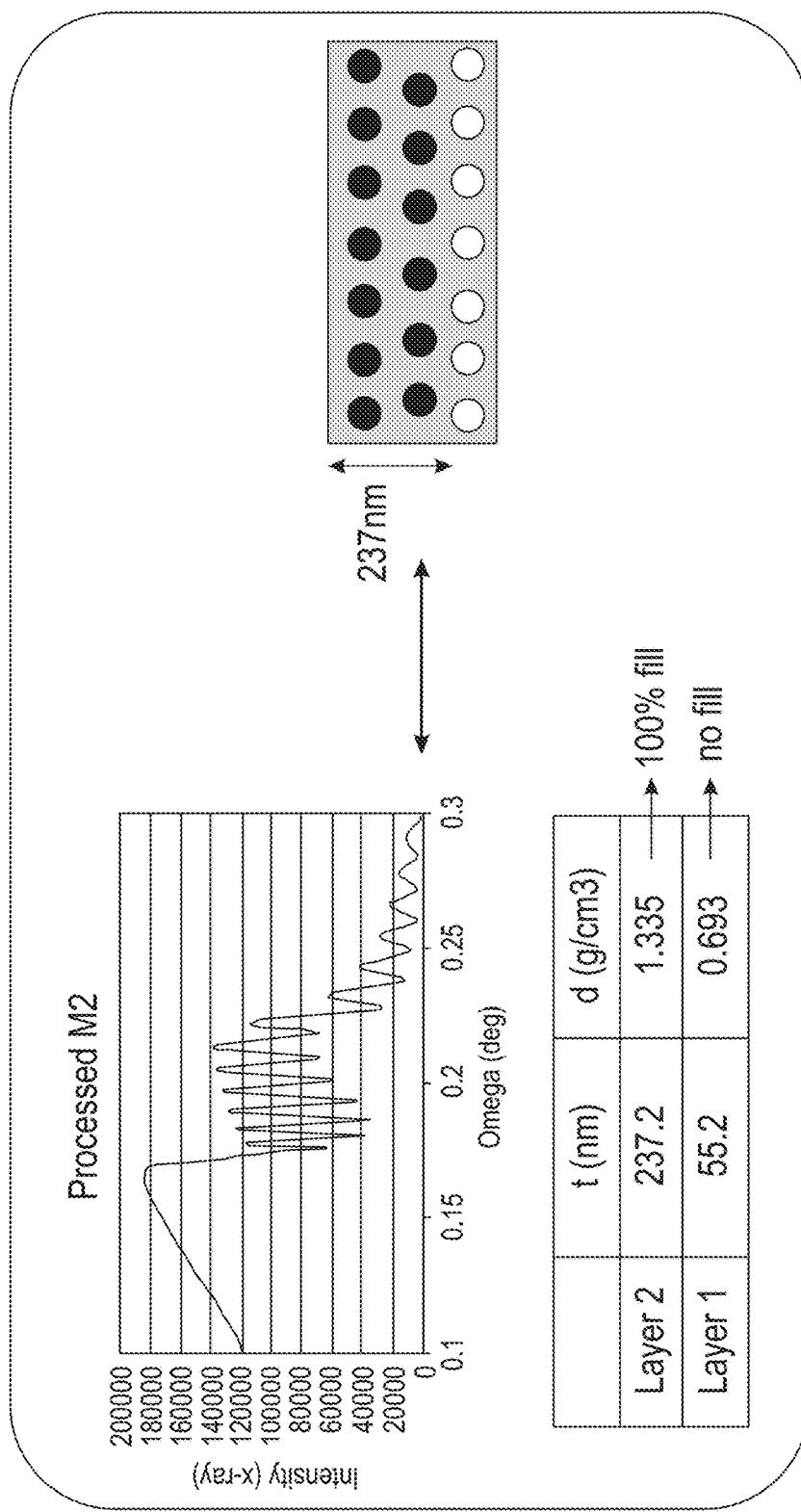
FIG. 5B includes a graph showing X-ray reflectivity (XRR) data for the M2 porous film as well as a diagram illustrating the anchoring of the polymeric material onto the M2 film and a corresponding data table providing numerical values for the polymer anchoring on the M2 film.
Figure 6:
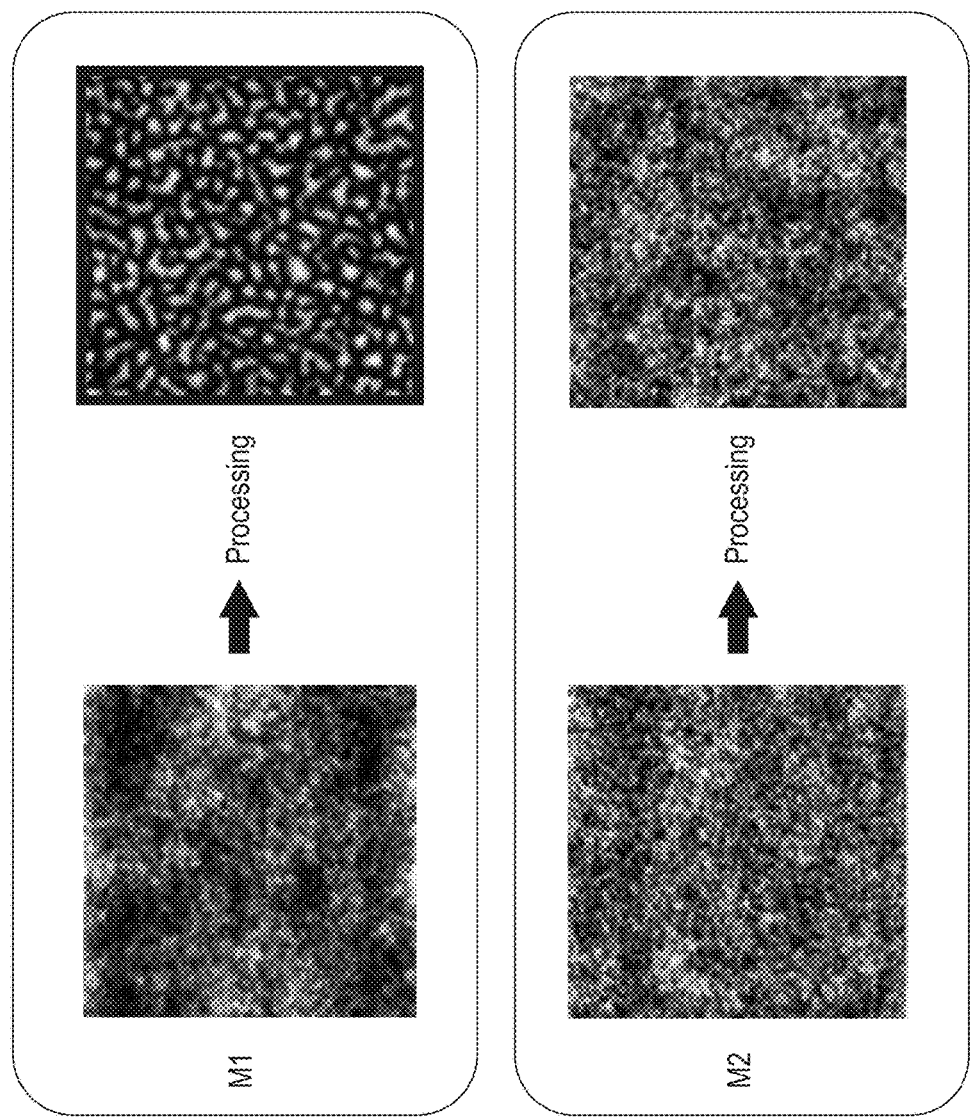
FIG. 6 shows 1×1 $\mu m^2$ atomic force microscopy (AFM) images of the surface topography of the M1 and M2 porous films.

Example 1 and FIGS. 4-6 demonstrate how different pore sizes in two identical silica films (M1 and M2) affect the mechanical anchoring of the polymer PMMA (100 kDa). Table 1 in Example 1 provides the characteristics of the M1 and M2 films. As described in Example 1, the M1 and M2 silica films were both treated according to the three-step process described herein. After step 2 (the baking step), the PMMA had penetrated 237.2 nm into the 292.4 nm M2 film by way of the larger 9 nm pores, while the PMMA had only penetrated 38.3 nm into the 337.3 nm M1 film by way of the smaller 2 nm pores (FIG. 5). After step 3 (the rinsing step), the M1 film displayed surface modification (FIG. 6, bottom panel) while the M2 film did not (FIG. 6, top panel). The M2 film failed to show surface modification because the polymer chains of the PMMA were not anchored in the larger pores of the M2 film and the PMMA polymer chains had washed away in the rinsing step.

Figure 7:
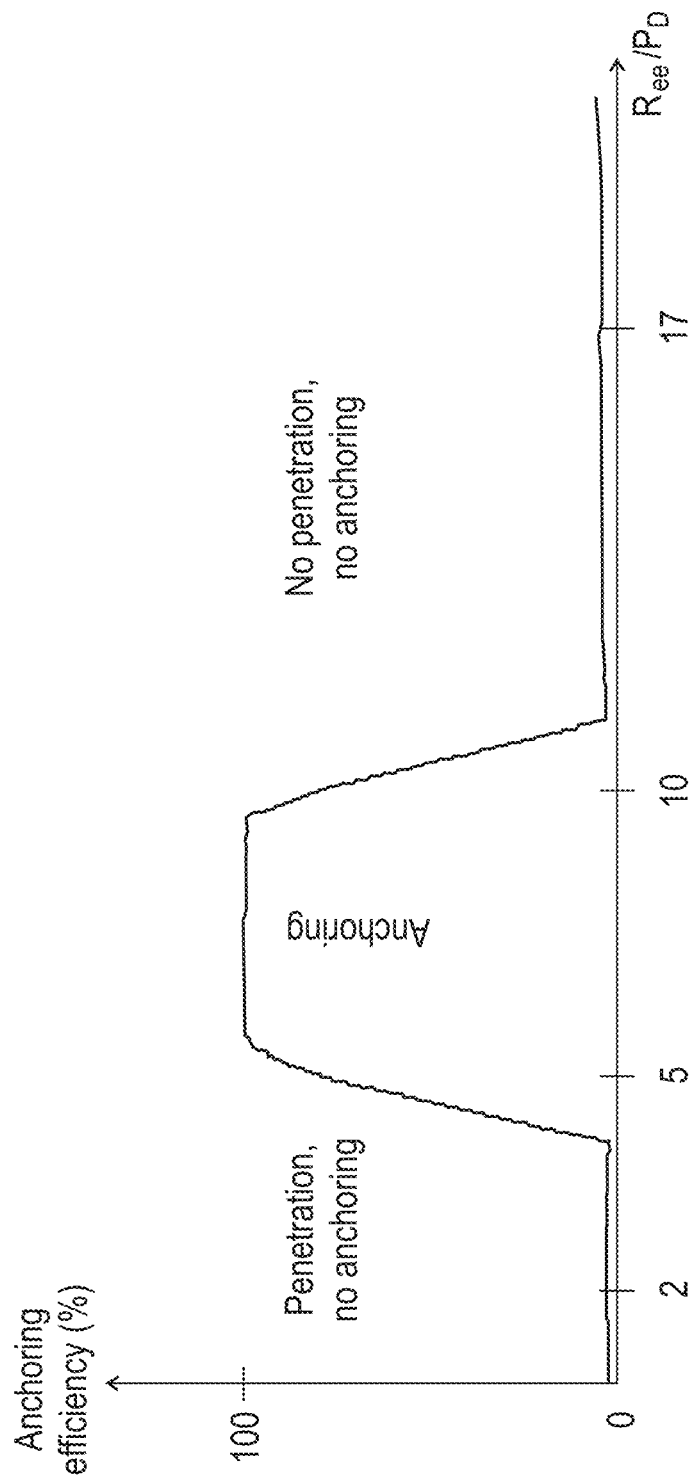
FIG. 7 is a graphical representation of the efficiency of mechanical anchoring as a function of relative size between polymer chain end-to-end radii and substrate pore diameter ($R_{ee}/\varnothing_D$).

Example 2 and FIG. 7 demonstrate that effective anchoring of a polymer chain into the pore of a substrate is dependent upon the end-to-end radius ($R_{ee}$) of a polymer chain being approximately 5-10 times larger than the pore diameter ($Ø_D$). Thus, for 100 kDa PMMA, which has an $R_{ee}$ of 20 nm, the 9 nm pores of the M2 film had an $R_{ee}/Ø_D$ of 2.2 ($R_{ee}/Ø_D=20/9=2.2$), which is a figure that falls within the "penetration, no anchoring" section of the graph of FIG. 7. As demonstrated in Example 1, penetration/no anchoring is what happened to the 100 kDa PMMA when it was processed into the M2 film. By contrast, the $R_{ee}/Ø_D$ value of 10 for the M1 film ($R_{ee}/Ø_D=20/2=10$) placed it within the "anchoring" section of the graph of FIG. 7. $R_{ee}/Ø_D$ values that are greater than 10 fall within the "no penetration, no anchoring" section of the graph of FIG. 7. With reference to 100 kDa PMMA, if this polymer, which has an $R_{ee}$ of 20, were to be processed with a film that has pores less than 2 nm, the PMMA would not be able to penetrate the film because the pores would be too small. The result, as shown in FIG. 7, is no penetration/no anchoring.

Figure 8:
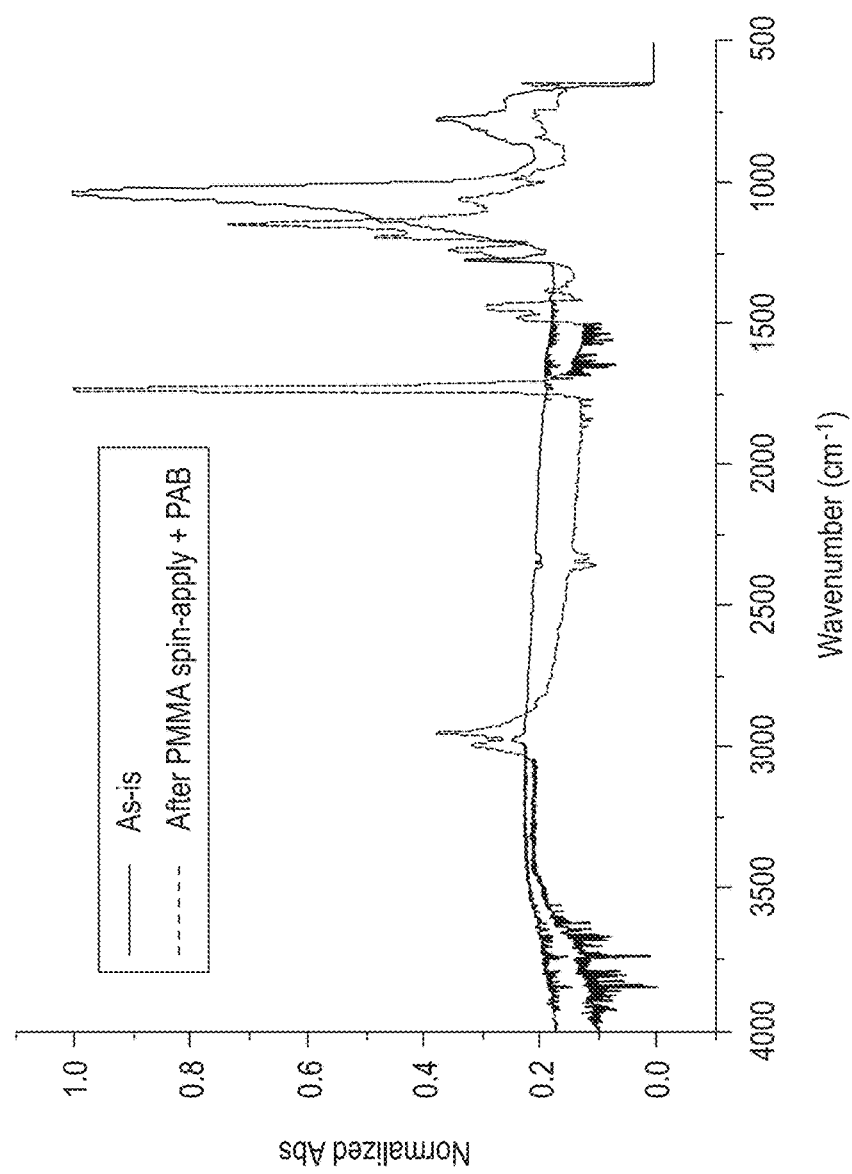
FIG. 8 is a graphical representation of the infrared (IR) spectra (normalized absorption as a function of wavelength) of a dense substrate as-is (solid curve) and after poly(methyl methacrylate) (PMMA) spin-apply and bake (broken curve).
Figure 9:
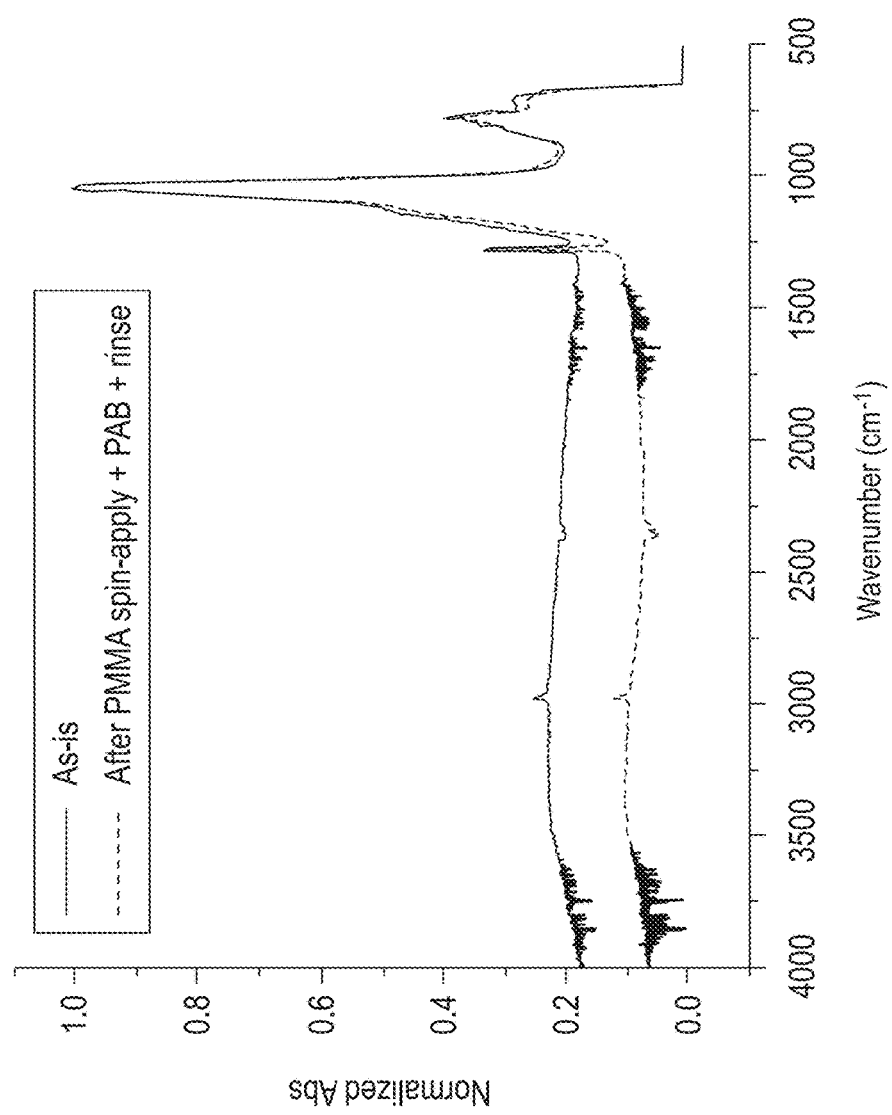
FIG. 9 is a graphical representation of the IR spectra (normalized absorption as a function of wavelength) of a dense substrate as-is (solid curve) and after PMMA spin-apply, bake and surface rinse (broken curve).

Example 3 and the experiments depicted in FIGS. 8 and 9 were carried out to confirm that the anchoring of the PMMA of Example 1 was the result of purely mechanical forces without any chemical bonding influences. This analysis was conducted by comparing IR spectroscopy scans of a silica film without any pores during the following steps of the surface modification process described herein: (i) prior to processing (the "as-is" solid curves in the graphs of FIGS. 8 and 9); (ii) after step 2 processing with 100 kDa PMMA (the "after" broken curve in the graph of FIG. 8); and (iii) after step 3 processing with 100 kDa PMMA and solvent rinse (the "after" broken curve in the graph of FIG. 9). Because the films had no pores, the PMMA could only be present on the surface of the film. The spikes shown in FIG. 8 at 1700 cm$^{-1}$, 1450 cm$^{-1}$, and 1150 cm$^{-1}$ correspond to the presence of PMMA polymer chains on the surface of the film. In FIG. 9, the spikes had disappeared because the PMMA polymer chains had washed away in the rinsing step. If the PMMA in FIG. 8 could chemically react with the surface of the film, the PMMA would not have been expected to wash away so readily on the rinsing step.

The surface modification techniques of the present invention have application in all industries previously described herein where surface modification is used or required. It is to be understood that the surface modification techniques described herein are not limited to the industries, or applications, disclosed, but may have utility in any additional industries, or applications, where surface modification is used or required.

While the present invention has been described in conjunction with the embodiments set forth above, the foregoing description and the examples that follow are intended to illustrate and not limit the scope of the invention. Further, it is to be understood that the embodiments and examples set forth herein are not exhaustive and that modifications and variations of the invention will be apparent to those of ordinary skill in the art without departing from the scope and spirit of the invention.

EXPERIMENTAL

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

Example 1

Determining Optimal Polymer Size to Substrate Pore Diameter

An experiment was conducted to determine the optimal ratio of polymer size to pore diameter in order to have effective mechanical anchoring of a polymer chain to a porous substrate. To calculate this ratio, the upper and lower limits of the polymer size and the substrate pore diameter must be measured. The polymer size is calculated by measuring the end-to-end radius ($R_{ee}$) of the individual polymeric chains in nanometers and the substrate pore diameter ($Ø_D$) is measured in nanometers.

In this experiment, the following two porous thin hybrid silica films (M1 and M2) having the same thicknesses, but different pore diameters, were used. The porosity data for the two films are provided in Table 1 and are shown graphically in FIGS. 4A, 4B, 5A, and 5B:

TABLE 1

| Film | Film Thickness | Porosity | Average Pore Diameter |
|---|---|---|---|
| M1 | 337.3 | 29% | 2 nm |
| M2 | 292.4 | 53% | 9 nm |

The M1 and M2 films were treated with a polymer solution according to the three-step process described herein and shown schematically in FIG. 1 using the same polymer: 100 kDa PMMA, which has polymer chains with a $R_{ee}$ of 20 nm. The M1 and M2 were characterized before and after processing, using two different characterization techniques: X-Ray Reflectivity (XRR) and Atomic Force Microscopy (AFM). As shown in FIG. 5, XRR was used to determine whether the polymer chains penetrated within the pores and if so, how deep throughout the film thickness. As shown in FIG. 6, AFM was used to determine changes in surface topography and/or properties.

The XRR scans of the processed M1 and M2 samples were collected and fitted. For the M1 sample, the 100 kDa PMMA penetrated 38.3 nm into the 337.3 nm pore—approximately 10% of the entire film thickness. For the M2 sample, the 100 kDa PMMA penetrated 237.2 nm into the 292.4 nm pore—approximately 80% of the entire film thickness. The foregoing showed that 100 kDa PMMA had the capability to penetrate the larger pores of the M2 sample more effectively than the smaller pores of the M1 sample.

Because XRR lacked the sensitivity to determine whether the polymer chains were dangling out of the pores on the surface of the M1 and M2 samples, AFM images were subsequently collected. FIG. 6 shows the difference in surface topography for the M1 and M2 samples before and after processing. The top panel of FIG. 6 shows that the processing of the M2 sample resulted in no significant changes in surface topography, indicating that no dangling polymer chains were present on the surface of the M2 sample after processing. Like the scenario depicted in FIG. 2, with the M2 sample, the polymer chains were only slightly larger than the M2 sample pore diameter ($R_{ee}/\varnothing_D=20/9=2.2$) and thus, not large enough to lock the polymer chains at the entrance of the pores; consequently, the M2 sample had no surface modification. The bottom panel of FIG. 6 shows that the processing of the M1 sample resulted in a significant change in the surface topography of that sample; specifically, the processed sample depicted dark and light islands. The light islands on the processed M1 sample corresponded to a higher topography, indicating that the polymer chains had mechanically anchored in the pore with a portion of the chain dangling on the surface ($R_{ee}/\varnothing_D=20/2=10$).

Example 2

Determining Parameters for Optimal Anchoring Efficiency

Additional experiments similar to that of Example 1 were conducted using: (1) various porous hybrid silica substrates with different pore diameters; and (2) polymers of different nature and different molecular weights. All hybrid silica substrates were prepared from different organoalkoxysilane precursors. Table 2 shows the different polymers and substrates that were used to test the efficacy of different materials on surface modification by way of mechanical anchoring.

TABLE 2

| Polymer Material | Polymer Molecular Weight | Substrate | Substrate Pore Diameter | $R_{ee}$ | $R_{ee}/\varnothing_D$ | Anchoring |
|---|---|---|---|---|---|---|
| PMMA | 100 kDa | M1 | 2 nm | 20 nm | 10 | Yes |
| PMMA | 100 kDa | M2 | 9 nm | 20 nm | 2 | No |
| PMMA | 100 kDa | M3 | 0.6 nm | 20 nm | 2 | No |
| Polystyrene | 50 kDa | M2 | 9 nm | 20 nm | 5 | Yes |
| Polystyrene | 400 kDa | M2 | 9 nm | 45 nm | 8 | Yes |
| Polystyrene | 13 MDa | M2 | 9 nm | 75 nm | 17 | No |

The results of the application of the polymers to the hybrid silica substrates are show graphically in FIG. 7. As shown in Table 2 and in FIG. 7, the most effective mechanical anchoring of the polymers to the substrates occurred when the end-to-end radii ($R_{ee}$) of the polymer chains was approximately 5 to 10 times larger than the substrate pore diameter ($\varnothing_D$) (i.e., $R_{ee}/\varnothing_D \approx 5\text{-}10$).

Example 3

Mechanical Anchoring of the Polymer Chains to the Substrate Pores Involves No Chemical Reactions An additional experiment was carried out to confirm that the anchoring of the polymers in preferred aspects of the invention is purely mechanical and that the anchoring does not include a chemical reaction between the polymer and the substrate surface.

A dense hybrid silica film substrate having no pores and a similar chemical composition to the M1 and M2 films was processed in the same way that the M1 and M2 films were processed; specifically with 100 kDa PMMA.

FIG. 8 shows the IR spectroscopy results of the processing. The IR scans were carried out prior to processing (shown with the "as-is" solid curve) and after step 2 of the surface modification method described herein (shown with the broken curve). With reference to FIG. 8, additional peaks can be seen on the broken curve (the processed substrate) as compared to the solid curve (the pre-processed substrate) around 1700 cm$^{-1}$, 1450 cm$^{-1}$, and 1150 cm$^{-1}$; these additional peaks represent the presence of PMMA on the substrate surface.

FIG. 9 shows the IR spectroscopy results after the substrate with rinsed with the solvent according to step 3 of the surface modification method described herein. FIG. 9 shows no significant difference between the pre-processed substrate (shown with the "as-is" solid curve) and the rinsed processed substrate (shown with the broken curve). These results indicate that there is no PMMA left on the surface of the dense substrate. This result confirms that the surface modification observed in the case of the porous matrix M1 was obtained by mechanical anchoring of the polymers in the pores, without any chemical reaction or other specific interactions involved.

We claim:
1. A method comprising:
(a) depositing a polymeric material comprising individual polymer chains over a surface of a porous substrate, wherein each individual polymer chain has a first end and at least one end opposite to the first end;
(b) treating the polymeric material such that (i) the first end of each of the individual polymer chains mechanically anchors to a pore of the porous substrate and (ii) the at least one opposite end of each of the individual polymer chains extends from the surface of the porous substrate, wherein the mechanical anchoring is free of chemical bonds; and (c) removing excess polymeric material from the surface of the porous substrate, thereby removing individual polymer chains that are not mechanically anchored to a pore of the porous substrate.

2. The method of claim 1, where the at least one opposite end of the individual polymer chain comprises more than one opposite end extending from the surface of the porous substrate.

3. The method of claim 1, wherein each individual polymer chain has an end-to-end radius ($R_{ee}$) that is five to ten times larger than the average pore diameter ($\varnothing_D$) of the porous substrate.

4. The method of claim 1, wherein pores of the porous substrate have an average pore diameter in the range of about 1 nm to about 1 μm.

5. The method of claim 1, wherein pores of the porous substrate have an average pore diameter in the range of about 1 nm to about 200 nm.

6. The method of claim 1, wherein the polymeric material comprises linear polymers.

7. The method of claim 1, wherein the polymeric material comprises branched polymers.

8. The method of claim 1, wherein the polymeric material comprises a combination of linear and branched polymers.

9. The method of claim 1, wherein the polymeric material comprises linear and/or branched polymers selected from the group consisting of polymethacrylates, polyimides, polybenzoxazoles, polybenzimidazoles, poly(aniline), poly(phenylene sulfide), phenol-formaldehyde/cresol-formaldehyde resins, polystyrenes, polylactic acid, polyesters, poly(bisbenzocyclobutene), poly(divinylsiloxanebisbenzocyclobutene), poly(aromatics), polyamides, polyamide-imides, polyetherimides, polyphenylquinoxalines, poly(perfluoroethers), soluble, fluorinated polyalkanes, poly(acrylonitrile), polyetherketones, poly(vinylalcohol), poly(styrene-co-styrene sulfonic acid), poly(acrylic acid), poly(hydroxyethylmethacrylate), poly(vinyl imidizolium sulfobetaine), poly(vinyl pyridinium sulfobetaine), poly(amido amines), poly(styrene-butadiene-styrene) block copolymers, poly(butadiene), poly(isoprene), polysilazanes, polyureasilazane, poly(perhydrosilazane), polysilazanes, poly(metal oxides), silicates, titanates, aluminosilicates, aluminates, zirconates, and combinations thereof.

10. The method of claim 1, wherein the polymeric material comprises poly(methyl methacrylate) (PMMA).

11. The method of claim 1, wherein the polymeric material comprises polystyrene.

12. The method of claim 1, wherein the polymeric material comprises a combination of poly(methylacrylate) and polystyrene.

13. The method of claim 1, wherein the porous substrate is a silica film.

14. The method of claim 1, wherein the porous substrate is a material selected from the group consisting of zeolites, zeolite-like materials, pillared materials, clathrasils, clathrates, carbon molecular sieves, ordered mesoporous materials, organic/inorganic porous hybrid materials, porous metal oxides, and combinations thereof.

15. The method of claim 14, wherein the organic/inorganic porous hybrid materials include a porous hybrid silica film.

16. The method of claim 1, wherein the polymeric material is treated by baking the porous substrate at a temperature above the glass transition temperature of the polymer.

17. The method of claim 1, wherein the excess polymeric material is removed from the porous substrate with a solvent.

18. The method of claim 17, wherein the solvent is selected from the group consisting of propylene glycol methyl ether acetate, propylene glycol monomethyl ether, toluene, and combinations thereof.

19. A method, comprising:

(a) depositing a polymeric material comprising individual polymer chains over a porous substrate, wherein each individual polymer chain has a first end and at least one end opposite to the first end;

(b) promoting flow of the polymeric material into pores on a top portion of the porous substrate, wherein (i) the first end of the individual polymer chains mechanically anchors to a pore of the porous substrate, (ii) the at least one opposite end of the individual polymer chains extends from the surface of the porous substrate, and further wherein the polymeric material is not chemically bonded to pore walls of the porous substrate; and (c) removing, from the top portion of the porous substrate, a portion of the polymeric material, thereby removing individual polymer chains that are not mechanically anchored to a pore of the porous substrate.

20. The method of claim 19, wherein individual polymer chains of the polymeric material each have an end-to-end radius ($R_{ee}$) that is five to ten times larger than the average pore diameter ($\varnothing_D$) of the porous substrate.

21. The method of claim 19, wherein pores of the porous substrate have an average pore diameter in the range of 1 nm to 1 μm.

22. The method of claim 19, wherein pores of the porous substrate have an average pore diameter in the range of 1 nm to 200 nm.

* * * * *